United States Patent [19]

Apaydin

[11] Patent Number: 5,200,225
[45] Date of Patent: Apr. 6, 1993

[54] PIZZA BAKING PROCESS

[76] Inventor: Okan Apaydin, 213 Orchard Way, Wayne, Pa. 19087

[21] Appl. No.: 697,860

[22] Filed: May 9, 1991

[51] Int. Cl.⁵ ............................ A21D 8/00; F24D 1/00
[52] U.S. Cl. ...................................... 426/510; 126/20; 126/369; 426/511; 426/523
[58] Field of Search ............... 426/496, 520, 510, 511, 426/523; 99/467, 473, 415, 417; 126/20, 369; 219/401

[56] References Cited

U.S. PATENT DOCUMENTS 2,674,935  4/1954  Lewis et al. ........................ 99/473
4,509,412  4/1985  Whittenburg et al. .............. 126/369
4,585,661  4/1986  Brummett ............................ 426/510

*Primary Examiner*—George Yeung
*Attorney, Agent, or Firm*—Eugene Chovanes

[57] ABSTRACT

A machine and process for quickly baking pizza. Dry super-heated steam at about 600° F. is flash-generated in one compartment of the machine by spraying water on metal plates. The steam passes to another compartment of the machine where the pizza rests on a hot metal plate. The pizza is quickly baked from the combined effects of the steam and the hot plate at a temperature in the range from about 650° F. to 690° F.

4 Claims, 4 Drawing Sheets

PIZZA BAKING PROCESS

BACKGROUND OF THE INVENTION

1. Field of the Invention

This invention relates to a machine for the commercial baking of pizza which is a very well known dough product having a shell and a topping contained within the shell. The invention also relates to a process of baking such a pizza.

Pizzas are in effect a form of pie, having a crust and a filler within the crust. Webster's Third International Dictionary defines pizza as, "... a usually large open pie made typically of thinly rolled bread dough spread with a spiced mixture (as of tomatoes, cheese, ground meat, garlic, oil) and baked".

A substantial portion of pizza consumed is baked at commercial establishments called "pizzerias", where it is eaten on the premises, picked up for take-out, or ordered for delivery, hot, to homes.

The present invention involves a machine for baking pizza at a commercial establishment, permissibly by the individual consumer on a self-service basis, and to a particular process for the baking of such pizza.

2. Description of Related Art

Pizzas taste best when eaten freshly baked and hot. Where the pizzas are baked commercially at a pizzeria (such as a bakery, restaurant, shop) where pizzas are made and sold, ovens are used for the baking. The ovens at such establishments are relatively large, stationary structures that are generally vented to the atmosphere through a suitable chimney or vent because of the high and sustained baking heats that are involved. The ovens often have a chamber of brick or stonework used for the baking. The ovens provide a dry heat for baking the pizza. Baking time ranges generally from about eight to fifteen minutes for a common size pizza such as one 8" in diameter. Such ovens and baking time generally produce an excellent product. However, baking in such an oven requires substantial time by today's standards, and also requires an exclusive area in which the oven can be permanently constructed and vented.

Such prior art requirements of time and space have generally prevented pizza baking and preparation at convenient consumer outlets and retail stores such as the well known convience stores wherein purchases of foodstuffs and other commodities are made at all hours of the day and night, under hurry-up conditions. Such establishments feature fast service wherein the purchaser or consumer comes into the establishment and is anxious to make his purchase and depart. Many such establishments offer foods including soup, sandwiches and chillies, which can be heated in a microwave on the premises, optionally by the customer. However, pizza dough, as well as other doughs, are known to become "tough" by microwaving and, depending upon the amount of heat, cheese—a basic pizza ingredient—can sometimes curdle.

Although pizza is a very inviting, appetizing and desirable commodity, since it requires for best effect a baking virtually immediately prior to consumption, pizza preparation and sale has not been extensively offered in such establishments.

The present invention offers the convenience of microwaving with all the benefits of conventional oven baking, in addition to a number of advantages over such conventional oven baking.

SUMMARY OF THE INVENTION

The present invention is a pizza baking machine and process which can prepare, in a convenient size, for instance, two 8" pizzas, in three minutes, as opposed to the old oven concept which baked the pizza in from eight to fifteen minutes. The pizzas are fully baked and present as good if not a better product than those prepared in a conventional oven.

The present pizza baking machine uses steam and electricity. The steam is flashed in the machine to a very dry super-heated state, in which state it is available both as a heat source for baking and a humidifier for the dough to prevent drying out from the heat produced by an electrically heated grid plate.

No vent is necessary since the baking process takes place in a relatively short period, for instance three minutes, and most of the heat produced by the machine, which is desirably well insulated, is absorbed in the baking process or readily dissipated in the atmosphere during and after the baking process.

The machine and process of the invention permit an easy and convenient means for permitting, with reasonable care, a user such as a convenience store customer to, by virtue of a self-service procedure, prepare his or her own pizza. The machine also is available for repeated use so that, particularly during busy mealtimes, consumers can obtain an on-the-spot baked pizza in a short period of time.

Of course, the pizza shells and topping are prepared, as in the prior art, and refrigerated. The baking process of the present pizza machine begins with the pre-baked pizza shell and filling.

BRIEF DESCRIPTION OF THE DRAWINGS

FIGS. 5 through 7 show three stages of the baking process.

DESCRIPTION OF THE PREFERRED EMBODIMENT

Figure 1:
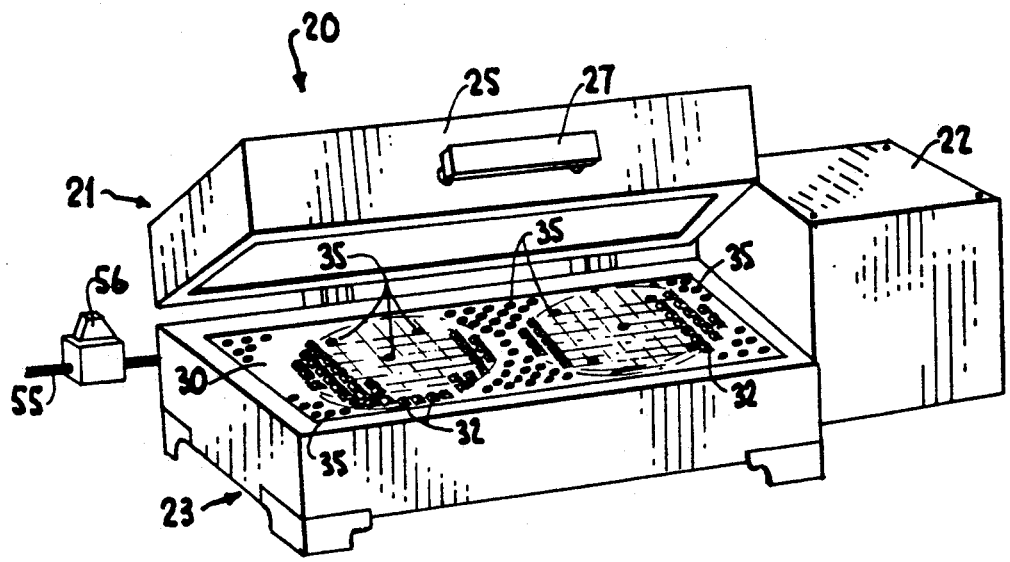
FIG. 1 is a front perspective view of the unit.
Figure 2:
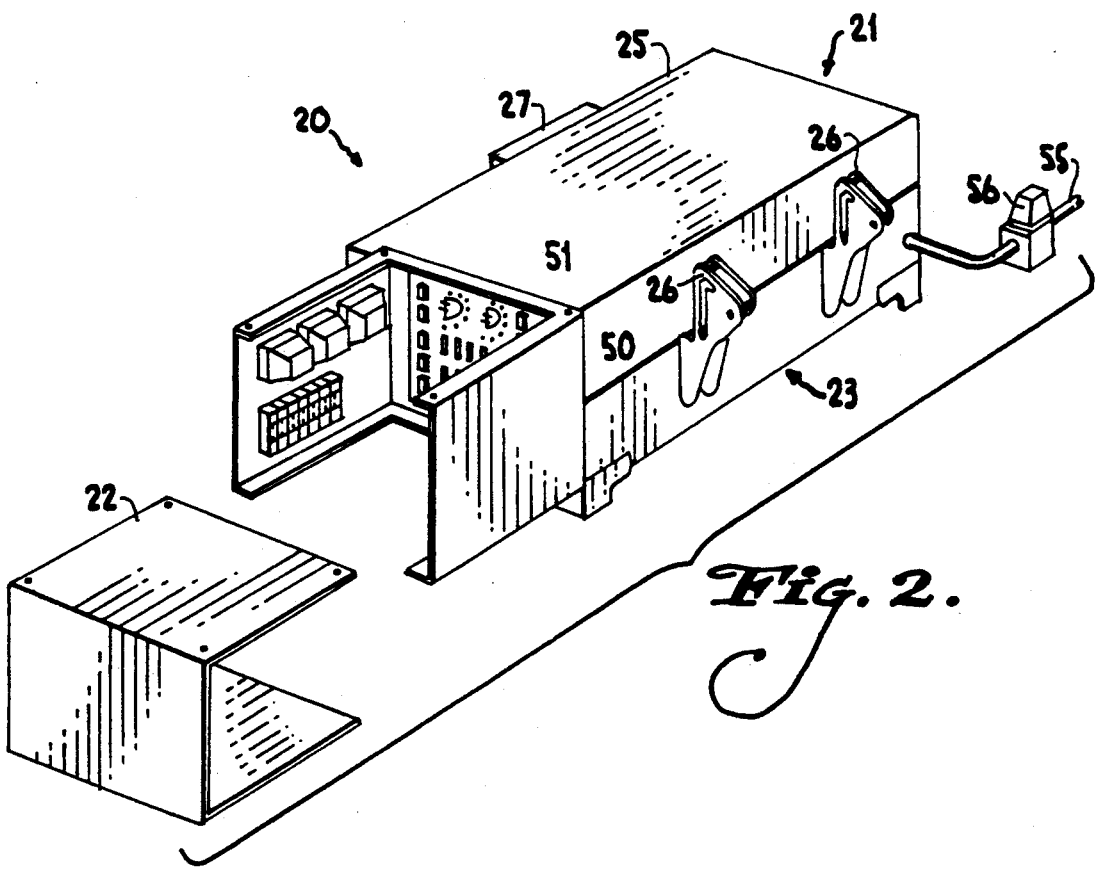
FIG. 2 is a rear perspective view of the unit shown in FIG. 1, with the electrical cabinet exposed.

Referring to FIGS. 1 and 2, the unit 20 comprises the baking section 21 of the machine and the electrical control section 22. The baking section has a base 23 and a cover 25. The cover and base are hinged with hinges 26. A handle 27 permits the cover 25 to be lifted on hinges 26 to an open position. The cover is lifted totally to permit access to base portion 23 at the top thereof.

Figure 3:
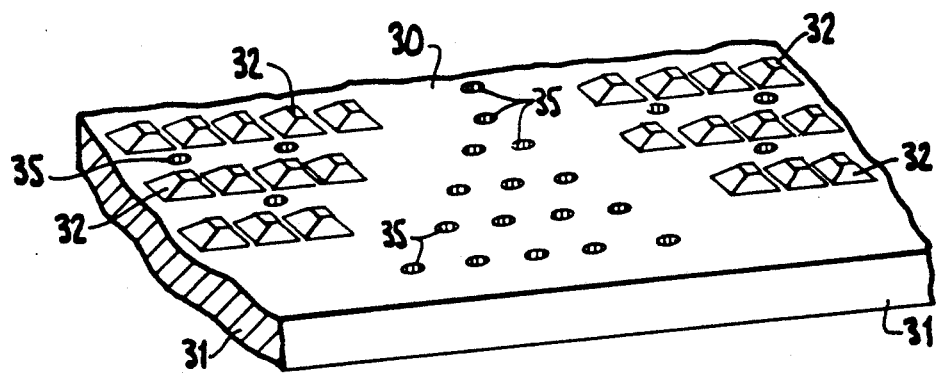
FIG. 3 is an enlargement of a portion of the waffle plate.

Inserted in base portion 23 is waffle plate 30 of a relatively heavy metal construction of, for instance, aluminum The plate 30 as seen in FIG. 3 has a thickness 31 of, for instance, ¼" and, in the embodiment described, would be of a 13"×21" size. The plate 30 on its upper side has lugs 32 in grid fashion as, for instance, in a waffle iron of the well known type. In this instance, the lugs may have a height of ¼" and a top surface of ¼" square. The lugs are slightly tapered to a base of a ⅜" square. The lugs extend over an area which corresponds to the size of the pizza being baked. In this instance, there are two circles of lugs, each 9" in diameter, symmetrically spaced on the plate, for simultaneously baking two 8" pizzas side by side. The lugs 32 are spaced in a grid pattern, one from another, with their center points in plan view being about 1¼" apart. The waffle plate 30 has holes 35 which are drilled completely through the plate vertically. The holes 35 are placed within and without the grid area, with most of the holes without the grid. For instance, fifty-five holes, ¼" in diameter, are symmetrically arranged outside the grid, and seven within each of the grids. Of the fifty-five outside holes, thirty-one are put in the area between the circular 9" grids.

The waffle plate 30 is set within base 23 by suitable means such as a ledge placed around the inner side of vertical walls 40 of the base. The walls 40 are, for instance, 4" high and of a sheet metal construction, having sheets of metal on the inside and outside with a filler of insulating material such as fiber glass between the walls. The walls can be, for instance, 1" thick.

A top flange 41 extends around the perimeter of the base 23 at the top thereof. The bottom of base 23 is likewise constructed of sheet metal as are the sides with, again, suitable insulation. Within the base 23 at its lower portion, a bottom heated plate 43 formed by placing a resistant element 44 beneath the bottom of the plate, is supported. The plate is kept at a suitable temperature as will be described. The bottom plate 43 is thinner than the waffle plate 30, for instance 1/16" thick (16-gauge steel plate). Plate 43 is in pan form, with a flat bottom 45 curved up into sides 46. The pan-shaped bottom plate 43 extends across the entire bottom of the base 23.

The cover 25 which, when closed, forms an upper compartment 48 having walls 50 and a top 51 that are all suitably insulated and constructed as are the walls and bottom of the base 23. The length and width of the cover 25 conforms to the length and width of the base 23, and the walls of each are continuations of the other. The top 51 of the cover 25 has an upper heated plate 52 which forms the top of the upper compartment 48. Plate 52 extends the length and width of the machine, as does waffle plate 30 and the bottom plate 43. The upper plate 52 is, again, suitably of an aluminum metal construction with flat surfaces. The plate can have a thickness of, for instance, ¼". A suitable heating element 53 such as a resistant electrical unit is secured to the plate 52 at the top thereof between the insulated top of the upper cover and the upper plate 52.

A water line 55, connected to the water utility service line, passes through a timer valve 56 and extends into the base 23 into the pan shape of bottom plate 43. The water line enters through the bottom in plate 43 and in base 23 and is straight in form within the plate 43. The water line 55 has suitable nozzles 66, for instance three in number, directed upwardly toward the bottom of waffle plate 30. The water line can be of a ¼" diameter, suitably of copper. The water line is slightly elevated above bottom 45 of bottom plate 43.

Waffle plate 30 has suitably secured to its bottom an electrical resistant heating element 59. When the parts of unit 20 are assembled and the machine closed, there are essentially two compartments; namely a lower compartment 60 formed by the bottom of waffle plate 30 and bottom plate 43, and an upper compartment 61 formed by the top of waffle plate 30 and upper plate 52. The walls of the base 23 and cover 25 complete the enclosure of the compartments.

The function of the lower compartment 60 is to create steam and this will be in subsequent description referred to as a "steam generating compartment 60".

The function of the upper compartment 61 will be to bake the pizza and will be referred to, in further description, as a "baking compartment 61".

Figure 6:
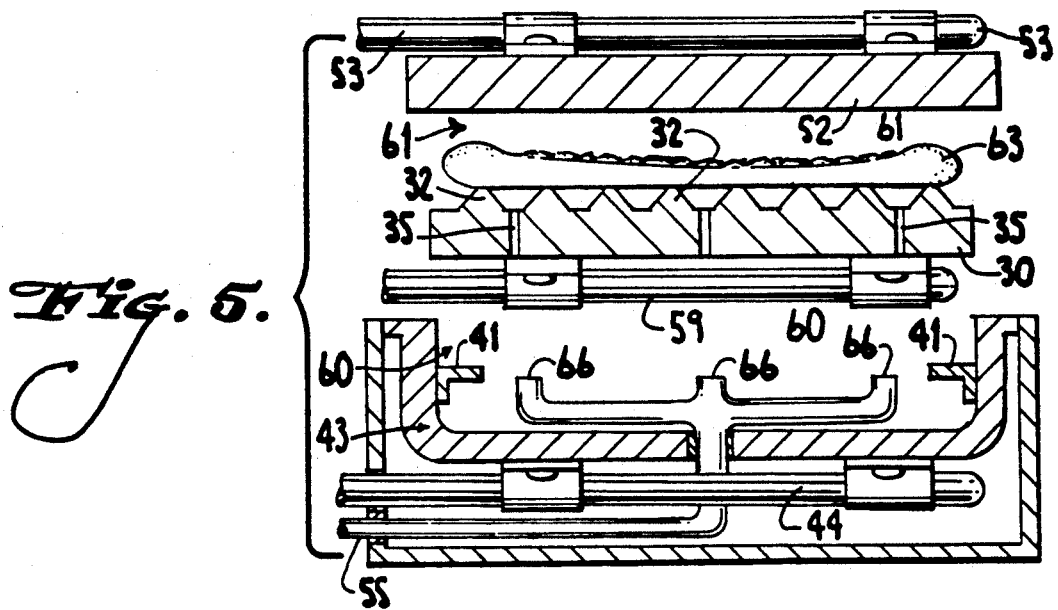
Figure 6:
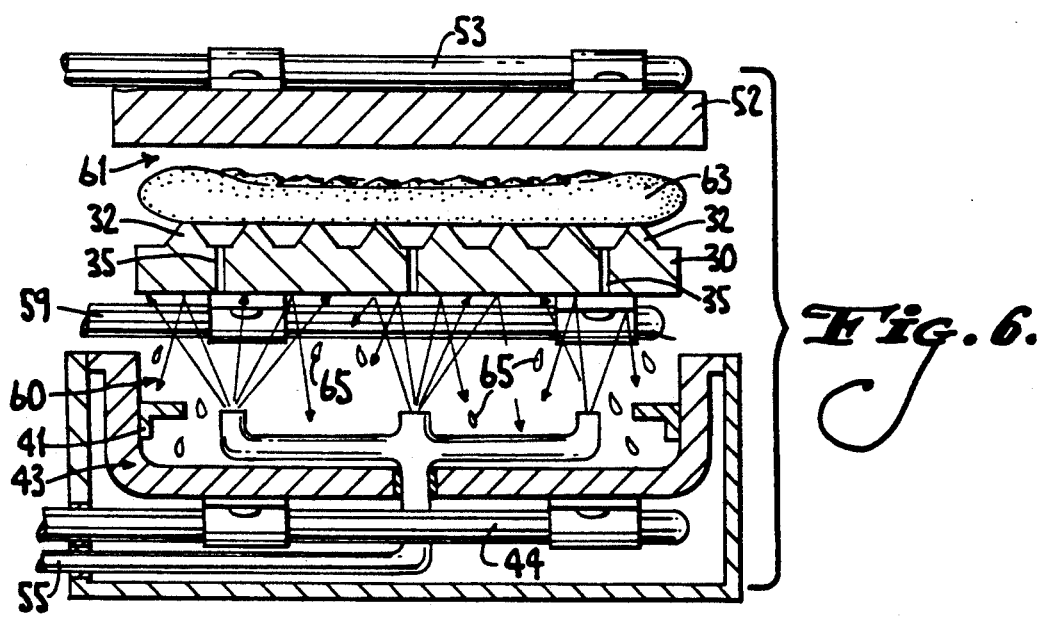
Figure 7:
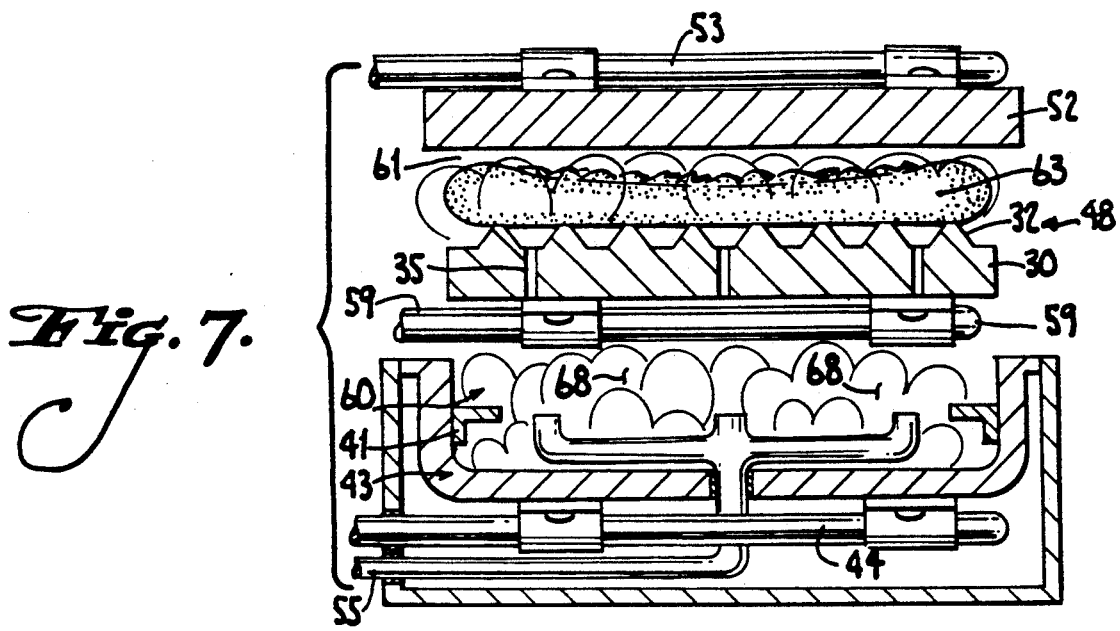

The compartments are shown schmetically in FIGS. 5 through 7.

In use, operation of the pizza machine involves, as seen in FIGS. 5, 6 and 7, a series of steps which take place in the machine described above during, in this embodiment, a three-minute period. The closed machine has a lower steam generating compartment 60 and an upper baking compartment 61. Prior to closing the cover 25, in this instance, a 8" diameter pizza 63 which has, as is conventional, a pre-baked shell and a filler, is placed on the waffle plate 30. Two pizzas 63 are baked simultaneously in the machine and are placed side by side, within the machine. The cover 25 is then closed. A switch is activated and suitable, well known electronic controls in electrical box 22 start the cycle.

It should be emphasized that the machine is turned on initially and generally allowed to stay on, since it takes about twelve minutes to heat up to a ready state. In this arrangement, the waffle plate 30 is kept at 540° F., the upper plate 52 is at 700° F., and the bottom plate 43 is kept at 450° F. This creates a temperature within the baking compartment 61 of the machine of about 660° F. When the machine is at this temperature, an indicator light activates, indicating it is ready for a cycle of operation.

In the cycle of operation, pizzas are placed in the machine as described, and the cover 25 closed. A spatula or the like may be used to transfer the pre-baked pizza shell which has been filled with topping onto the waffle plate 30. The pre-baked pizza shell is relatively firm so that it can be handled and can stand by itself with no need for the use of a pan during the baking process.

Figure 4:
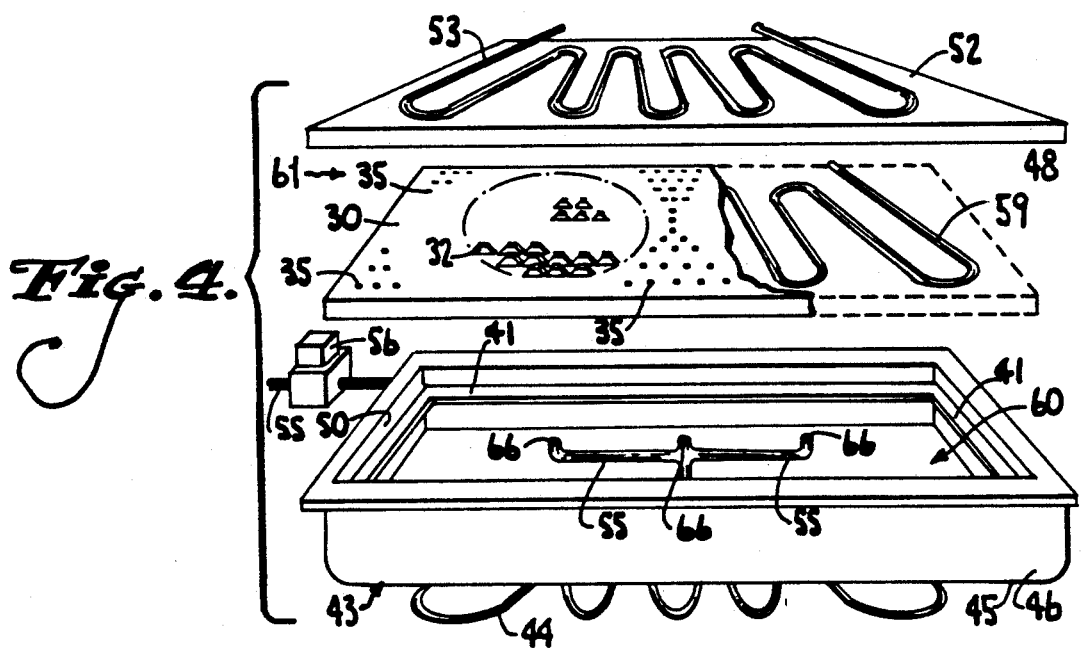
FIG. 4 is an exploded perspective view of the three main components of the pizza machine.

A switch is then activated by the user. This starts the baking cycle which is electronically controlled by the electrical and electronic controls in section 22. Initially the timer valve 56 is opened and a measured quantity of water then passes into the machine through water line 55 as shown in FIG. 4. The water 65 is sprayed upwardly through jets onto the bottom of waffle plate 30 as seen in FIG. 6. In baking the two 8" pizzas, the quantity of water introduced into the machine by timer valve 56 is approximately 10 grams or about ⅓ oz. The spray nozzles 66 each have a flow hole of a size that passes this total amount during a given period, for instance three seconds. The nozzles 66 in effect act as water flow restrictors.

The water 65 sprays against the bottom of waffle plate 30 and the majority of water is flashed into steam which fills steam-generating compartment 60. The remaining water which is not flashed upon impact on waffle plate 30 drops to the bottom of steam-generating compartment 60 and lands on bottom plate 43. The water at this point that falls on bottom plate 43 is also vaporized into steam, so that all water entering into the lower steam-generating compartment 60 is vaporized into steam. The steam creates a certain amount of pressure which forces the steam up through holes 35 in waffle plate 30 from the steam-generating compartment 60 into the baking compartment 61. The steam 68 is in a super-heated, dry state, at about 600° F. The steam 68 in the baking compartment 61 surrounds the pizza 63 which is now being baked by virtue of the heated environment, including super-heated steam 68 in the baking compartment 61 as well as under the influence of the heated lugs 32 on the waffle plate 30. The baking continues for about three minutes. During this period of time, more than half the steam 68 is absorbed into the pizza 63 and not only prevents drying of the pizza from the heat, but also actually rejuvenates the pre-baked shell which undergoes a certain drying effect during its refrigerated storage phase. The steam 68 provides a moderating and beneficial influence to keep the pizza 63 and particularly the crust and the ring which is desirably formed around the perimeter of the crust, in a fluffed and expanded condition. The steam also prevents the drying out of the pizza 63 and burning that would occur without steam, since the temperatures within the baking compartment and particularly of the waffle plate are such that such burning or at least unacceptable drying would occur. At the end of a three-minute cycle, the termination of the baking occurs, and the cover is opened by the user upon an indication such as a light or an audible indication such as a bell or buzzer. The pizza 63 is then removed and ready to eat.

Figure 8:
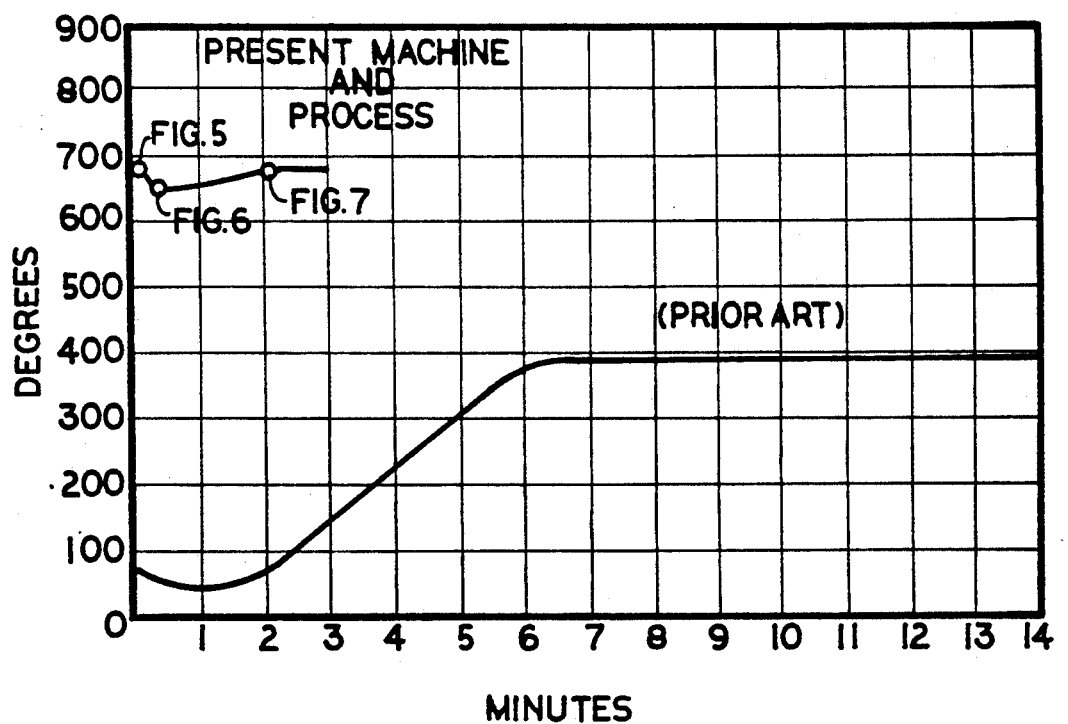
FIG. 8 is a graph depicting the process shown in FIGS. 5 through 7.

The baking cycle in time and temperature is shown in FIG. 8. As seen at the lefthand side on the vertical scale, the temperature of the environment while the machine is in ready position but unloaded, is about 690° F. Upon activation of the machine by the customer, there is a pause of five seconds and then water enters and is flashed into steam. As seen in FIG. 6, at the time the steam is being flashed, the temperature drops to about 650° F. Shortly thereafter, the temperature in the machine with the steam fully flashed rises slowly during the entire cycle to about 690° F. The total cycle lasts three minutes. The cover 25 is then opened and the pizza removed by a suitable instrument such as a spatula. The cover is then closed and the ambient temperature within the machine, in effect the "ready temperature", quickly returns to 690° F.

There is also shown in FIG. 8 a conventional oven cycle wherein the oven itself, after placing the pizza in the oven, would take up to six minutes to achieve a baking temperature of about 400° F., where it would remain for the remaining portion of the cycle, for a total oven time to bake the pizza of about fourteen or fifteen minutes.

It can be readily seen from FIG. 8 that the machine of the invention enables a pizza to be baked in substantially less time than required in a conventional oven.

I claim:

1. A process for fully baking a pre-baked pizza product just prior to consumption, which comprises:
    spraying water against a heated plate and flashing said water into dry super-heated steam at a temperature of about 600° F.,
    passing said steam into a baking compartment containing a pre-baked pizza, and
    maintaining a baking temperature in the range from about 650° F. to 690° F. in said baking compartment,
whereby said pizza product is fully baked for consumption.

2. A process of claim 1 wherein the baking temperature is about 660° F.

3. A process of claim 1 or 2 wherein about 10 grams of water is flashed into steam to bake two 8" pizza products having a crust thickness of about ½" in about three minutes.

4. A process of claim 3 wherein more than half of the steam is absorbed into said pizza product, whereby said pizza product is prevented from drying during said baking process.

* * * * *